Patented May 29, 1945

2,377,052

UNITED STATES PATENT OFFICE 2,377,052

METHOD OF PREPARING AQUEOUS DISPERSIONS OF RECLAIMED RUBBER

Albert M. Stover, Akron, Ohio, assignor to The B. F. Goodrich Company, New York, N. Y., a corporation of New York No Drawing. Application January 2, 1943, Serial No. 471,183

7 Claims. (Cl. 260—760)

This invention relates to artificial aqueous dispersions of reclaimed rubber and is especially concerned with methods of dispersing certain special types of reclaimed rubbers which, unlike ordinary reclaimed rubbers, exhibit physical characteristics and properties closely resembling those of crude natural rubber.

It is known that reclaimed rubber which reacts to processing operations in much the same way as natural crude rubber may be prepared by heating scrap vulcanized rubber in the presence of certain amine reclaiming agents. These amine reclaiming agents include hydroxylamine as disclosed in U. S. Patent No. 2,304,548; the hydroxy aliphatic amines and especially the alkanol amines such as monoethanolamine, the alkanediol amines such as 2-amino 2-methyl propanediol 1,3, and similar materials as disclosed in U. S. Patent No. 2,304,549; the aliphatic polyamines and especially the alkylene polyamines such as ethylene diamine, triethylene tetramine, tetraethylene pentamine, and similar polyamines as disclosed in U. S. Patent No. 2,304,550; and the aliphatic mercapto amines or, as otherwise termed, the aliphatic thiolamines, such as 2-amino ethanethiol, 1,3-diamino propanethiol, tri-isopropanethiol amine, 2-amino 2-methyl propane dithiol-1,3, phenyl diethanethiol amine, and similar compounds as disclosed in U. S. Patent No. 2,304,551. Other amine reclaiming agents also are known including piperidine and para-amido-dimethyl aniline as disclosed in U. S. Patent No. 1,235,850; and diphenyl guanidine, the aldehyde amines, such as polybutylidene aniline, and similar compounds as disclosed in U. S. Patent No. 2,211,592. The reclaimed rubbers produced by these latter reclaiming agents do not exhibit many of the unique and valuable characteristics of those produced by the agents of the first four mentioned patents but they, nevertheless, are useful for many purposes.

The industry has made considerable use of amine reclaiming agents and particularly amine agents of the type covered by the above-mentioned Patents Nos. 2,304,548, 2,304,549, 2,304,550 and 2,304,551. Also, efforts have been made to prepare aqueous dispersions of the resulting reclaimed rubbers in accordance with the procedure customarily followed in dispersing ordinary reclaimed rubbers. As described, for example, in U. S. Patent No. 2,006,841, such procedure usually consists in subjecting the reclaimed rubber to intensive mechanical working in an internal mixer or other appropriate apparatus and adding to the rubber, while it is undergoing such working, dispersing agents such as soaps, colloidal clays, glue, casein and the like, followed by the addition of a peptizing agent which usually is ammonia or, as in the above-mentioned patent, a solution of sodium or potassium ferrocyanide or ferricyanide.

Difficulty was encountered, however, in dispersing amine reclaimed rubbers by the conventional method. Unduly long periods of mechanical working were required to bring about dispersion and the dispersions which were obtained exhibited undesirably large particle size characteristics.

I have found that the character of dispersion obtained may be materially improved and that the time required to bring about dispersion may be substantially reduced by mixing with the reclaimed rubber a substantial quantity of carbon black and thoroughly working the carbon black into the rubber before any substantial quantity of dispersing agent is added to the batch, the term "dispersing agent" being here employed in the usual sense to include either the complete dispersing agent or a reagent added to form a dispersing agent in situ. Generally, the quantity of carbon black should be not less than substantially 2 parts by weight per 100 parts of reclaimed rubber although lesser quantities may be used with corresponding decrease in effectiveness. Best results are secured with quantities of carbon black varying from 8 to 12 parts by weight per 100 parts of rubber in the case of a hard carbon black such as a channel black, but, usually, not more than about 20 parts by weight of such black should be added to each 100 parts of rubber. If, however, one of the soft blacks, such as "P-33," is used, the quantity may be increased to as high as about 30 parts although best results are obtained with quantities in the range of 8 to 15 or 20 parts, all per 100 parts of reclaimed rubber.

Actual tests have shown that addition of carbon black as described reduces the time required to effect dispersion by half, 5 hours being required in a typical case without using carbon black whereas dispersion was effected in from 2 to 2½ hours when carbon black was used, all other conditions being the same in both cases. Also, the particle size characteristics of the resulting dispersion were greatly improved, the average particle size being reduced from the 2 to 5 microns range down to the 1½ to 2 microns range.

Dispersions produced in accordance with the present invention additionally show a very low degree of flocculation and have proved to be better adapted for admixture with natural rubber latex compositions.

The invention is particularly useful in dispersing amine-reclaimed rubbers prepared from inner tube scrap and the like which normally contain little, if any, carbon black except in the case of black inner tube scrap which may contain as high as 20 parts of black per 100 parts rubber, although it will be found useful in many instances for dispersing reclaims made from other types of rubber scrap as well.

The following specific example will further illustrate the manner of practicing the invention.

*Example*

Reclaimed rubber was prepared by mixing 100 parts by weight of ground inner tube scrap with 2 parts by weight of triethylene tetramine and heating the mixture for about 12 hours at a temperature corresponding to 200 lbs. steam pressure. The resulting reclaimed rubber was sheeted out on mills and passed through refiners in the manner customarily practiced in the reclaiming industry.

Ten pounds of the prepared reclaimed rubber were masticated for 20 minutes on a two-roll mill and then transferred to a 2½ gallons capacity internal mixer fitted with dispersion-type blades. Mastication of the rubber was continued in the mixer for about 30 minutes during which time one pound of hard carbon black was added progressively and worked thoroughly into the rubber. Thereafter, and as the working continued, $\frac{1}{16}$ lb. of flake potassium hydroxide was added over a period of about 20 minutes followed by sufficient water to dissolve the caustic, after which ½ lb. of oleic acid was added in small increments and worked into the batch, this requiring about 30 minutes during which time the caustic and the acid reacted to form a saponaceous dispersing agent. Then, two pounds of concentrated (28%) ammonia were added followed by eight pounds of dilute (2%) ammonia or a similar quantity of 2½% potassium ferrocyanide solution, the working being continued until the batch inverted and the aqueous phase became continuous, this requiring from 15 to 45 minutes in various instances.

Thus the total time required to prepare the dispersion was from 2 to 3 hours as compared with 5 hours required in typical trials under the same conditions but for the addition of carbon black. Also, the average particle size was reduced by about half.

Other dispersing and peptizing agents, of course, may be utilized and numerous other modifications and variations in details of the dispersion procedure may be effected in accordance with the usual practice in the art and as indicated, for example, in U. S. Patent No. 2,006,841.

Although the invention has been described in considerable detail and with particular reference to certain preferred procedures, materials, and proportions of materials, it will be understood that these are merely illustrative and not necessarily limitative of the invention, the scope of the invention being defined by the appended claims.

I claim:

1. In the preparation of an artificial aqueous dispersion of a difficultly dispersible reclaimed rubber resembling natural crude rubber in processing characteristics and which has been prepared by treating vulcanized rubber with an amine reclaiming agent, by a dispersing process in which the reclaimed rubber is subjected to intensive mechanical working, as in an internal mixer, and in which a dispersing agent and water are added as a discontinuous phase to the rubber as a continuous phase and such working continued until the phases invert and the aqueous phase becomes continuous, the method of improving the character of the dispersion obtained and of substantially reducing the time required to bring about dispersion which comprises admixing with the reclaimed rubber a dispersion-facilitating quantity of carbon black not greater than substantially 30 parts by weight per 100 parts of reclaimed rubber and thoroughly working the carbon black into the rubber while the rubber still constitutes the continuous phase and before any substantial quantity of dispersing agent is added, and thereafter adding a dispersing agent capable of producing a rubber-in-water dispersion.

2. A method as defined in claim 1 in which the quantity of carbon black added to the reclaimed rubber is not less than substantially two parts and not greater than substantially 30 parts by weight per 100 parts of reclaimed rubber.

3. A method as defined in claim 1 in which the quantity of carbon black added to the reclaimed rubber is from 8 to 15 parts by weight per 100 parts of reclaimed rubber.

4. A method as defined in claim 1 in which the quantity of carbon black added to the reclaimed rubber is substantially 10 parts by weight per 100 parts of reclaimed rubber.

5. A method as defined by claim 1 in which the carbon black is of the hard variety and in which the quantity of such black added to the reclaimed rubber is not less than substantially two parts and not greater than substantially 20 parts by weight per 100 parts of reclaimed rubber.

6. A method as defined by claim 1 in which the carbon black is of the hard variety and in which the quantity of such black added to the reclaimed rubber is from 8 to 12 parts by weight per 100 parts of reclaimed rubber.

7. In the preparation of an artificial aqueous dispersion of a difficultly dispersible reclaimed rubber resembling natural crude rubber in processing characteristics and which has been prepared by treating vulcanized rubber with an amine reclaiming agent, by an inversion dispersing process in which the reclaimed rubber is subjected to intensive mechanical working, as in an internal mixer, and in which a dispersing agent and water are added as a discontinuous phase to the rubber as a continuous phase and such working continued until the phases invert and the aqueous phase becomes continuous, the method of improving the character of the dispersion obtained and of substantially reducing the time required to bring about inversion which comprises admixing with the reclaimed rubber a dispersion-facilitating amount of carbon black not greater than substantially 30 parts by weight per 100 parts of reclaimed rubber and thoroughly working the carbon black into the rubber while the rubber still constitutes the continuous phase and before any substantial quantity of dispersing agent is added, and thereafter adding a saponaceous dispersing agent.

ALBERT M. STOVER.